United States Patent [19]

Nijenhuis

[11] Patent Number: 4,708,569
[45] Date of Patent: Nov. 24, 1987

[54] SILO

[75] Inventor: Harry Nijenhuis, Hoogeveen, Netherlands

[73] Assignee: Hydro Mecanique Research S.A., Luxembourg, Luxembourg

[21] Appl. No.: 925,924

[22] Filed: Nov. 3, 1986

[30] Foreign Application Priority Data

Nov. 7, 1985 [CH] Switzerland .................. 4790/85

[51] Int. Cl.4 .............................................. B60P 1/64
[52] U.S. Cl. .................... 414/332; 414/494; 414/539; 414/919; 52/116
[58] Field of Search ............... 414/919, 498, 469, 332, 414/494, 446, 467, 500, 539, 608; 52/116, 119, 143, 194

[56] References Cited

U.S. PATENT DOCUMENTS

| 1,849,424 | 3/1932 | Fontaine | 414/469 |
| 2,808,164 | 10/1957 | Glendinning | 414/919 X |
| 3,934,739 | 1/1976 | Zumsteg et al. | 414/919 X |
| 4,133,439 | 1/1976 | Goranson | 414/494 |
| 4,465,420 | 8/1984 | Dillman | 414/919 X |
| 4,561,821 | 12/1985 | Dillman | 414/919 X |
| 4,626,166 | 12/1986 | Jolly | 414/919 X |
| 4,634,335 | 1/1987 | van den Pol | 414/919 X |

FOREIGN PATENT DOCUMENTS 319110  3/1957  Switzerland .................. 414/919

Primary Examiner—Robert J. Spar
Assistant Examiner—Vien Q. Nguyen
Attorney, Agent, or Firm—Bernard, Rothwell & Brown

[57] ABSTRACT

A silo has a guide arranged along the silo container, and the guide has a stop at the upper portion of the silo. A coupling element can slide along the guide, which can be coupled with a tippable loading frame of a transport vehicle by a cable. This arrangement simplifies the loading and unloading of the silo onto or off of the transport vehicle.

7 Claims, 7 Drawing Figures

SILO

BACKGROUND OF THE INVENTION

1. Field of the Invention

This invention relates to improvements in material storage silos.

2. Prior Art

A silo having an attachment device for connecting the upper part of the silo to a tippable loading frame of a transport vehicle is known through prior use. Silos of this type are used, for example, to store cement or gypsum on construction sites. They are relatively large and must therefore be transported horizontally. To load such a known silo on a transport vehicle, the vehicle approaches close to the silo. The loading frame is tipped up into a nearly vertical position, in which it rises above the silo. The upper end of the silo is then connected to the loading frame with cables. As the loading frame is lowered, the silo is tipped and loaded onto the loading frame.

The disadvantage of this silo is that both during loading and unloading an operator must climb onto the silo in order to connect or disconnect the cable to or from the attachment device. There is a need in the art to eliminate this disadvantage.

SUMMARY OF THE INVENTION

This invention eliminates the above-mentioned disadvantage by providing the attachment device with at least one guide along the side of the silo, which guide has a stop at the upper portion of the silo as well as a coupling element for a cable that can slide along the guide. When the cable is disengaged, the coupling element is in its lowermost end position, e.g., at shoulder height of the operator. The cable can therefore easily be connected with the connecting device. As the cable is drawn in, the coupling element first slides up to the stop in the upper portion of the silo, whereupon the silo, like the conventional silo, can be loaded onto the transport vehicle. During unloading, the silo is first set down in the conventional manner. As the cable is further unwound, the coupling element slides down to its lower end position, where it again can be easily detached from the cable.

BRIEF DESCRIPTION OF THE DRAWINGS

FIG. 3 is a front view of a second embodiment;

DESCRIPTION OF THE PREFERRED EMBODIMENTS

Figure 1:
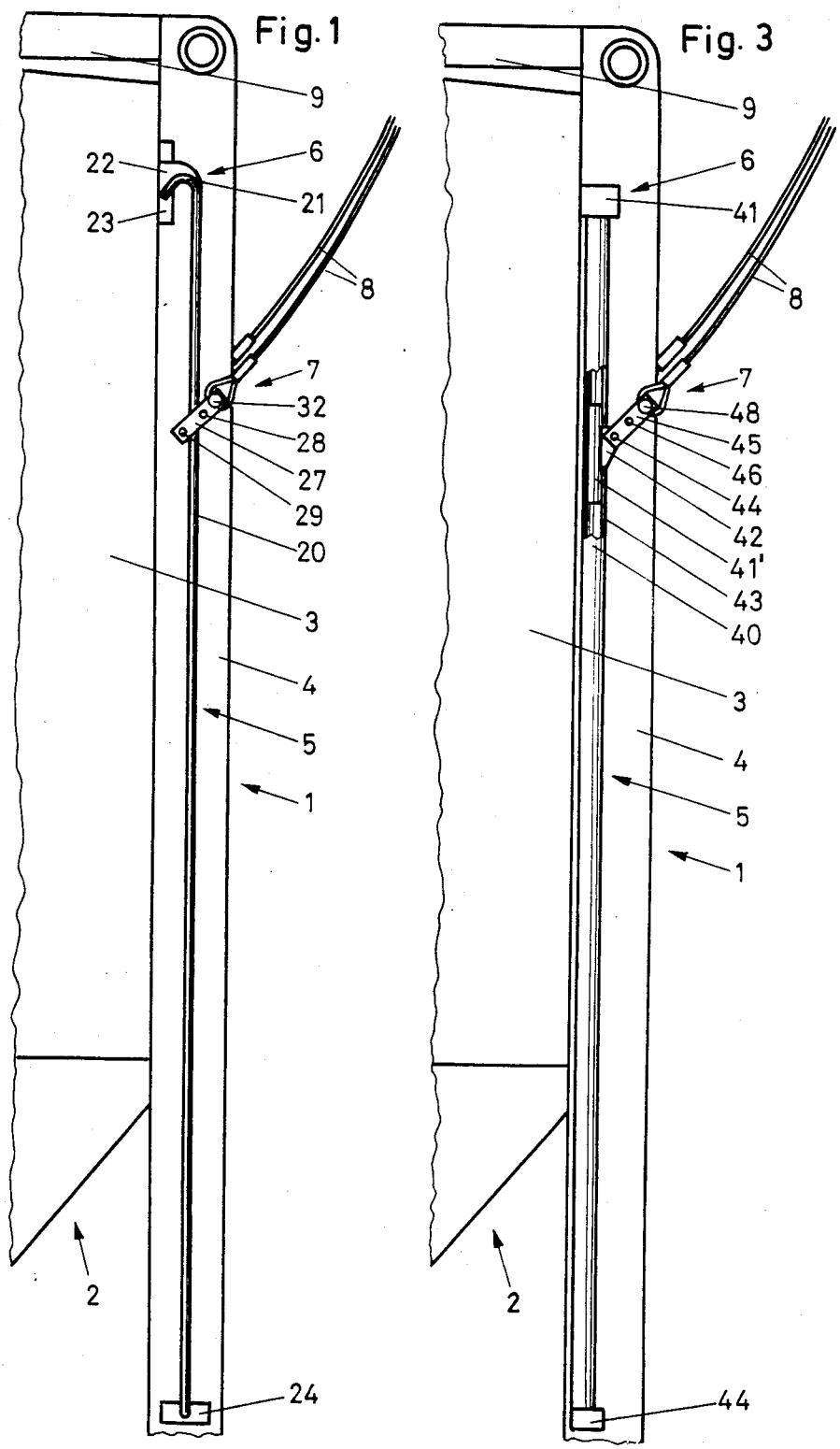
FIG. 1 is a front view of a first embodiment.
Figure 2:
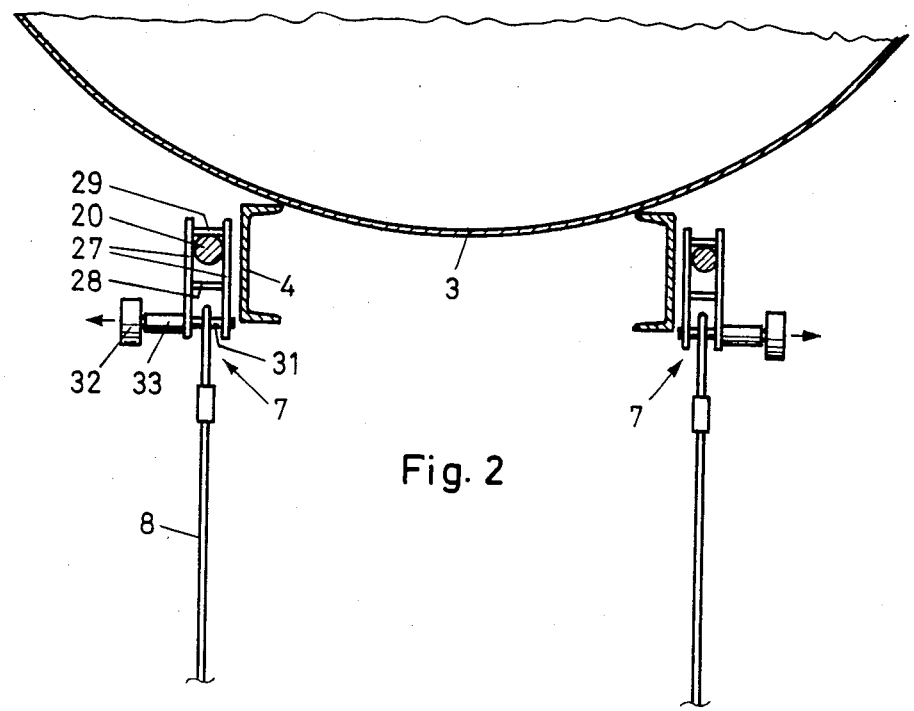
FIG. 2 is a cross-section through the embodiment according to FIG. 1.

In the embodiment according to FIGS. 1 and 2, two support members 4 are connected to a side wall 3 of a silo container 2, which support members 4 serve as legs for the upright silo 1 and as supports during transport. A guide bar 20 is attached to the side of each of the support members 4. The upper end of each bar 20 is bent at 21 to form stops 6 which are reinforced by plates 22 connected to the members 4 by connection blocks 23. The lower ends of the bars 20 are also connected with the members 4 by means of spacers 24.

The bars 20 are surrounded by a coupling element 7, which in the exemplary embodiment according to FIGS. 1 and 2 includes two parallel plates 27, which are rigidly connected with each other by two rods 28, 29. The bars 20 are arranged with play in the space between the plates 27 and rods 28, 29, so that the coupling element 7 can slide freely along the bars 20 between the spacers 24 and the upper stops 6. A sleeve 33 is attached to one plate 27, and a bolt 31 provided with a grip 32 is guided in this sleeve 33. The bolt 31 is prebiased into the illustrated basic position by a spring (not shown) in the sleeve 33, where it projects into a bore in the opposite plate 27. By pulling on the grip 32 in the direction of the arrow (FIG. 2), one can couple or uncouple an end loop of a cable 8 to or from the coupling element 7.

Figure 4:
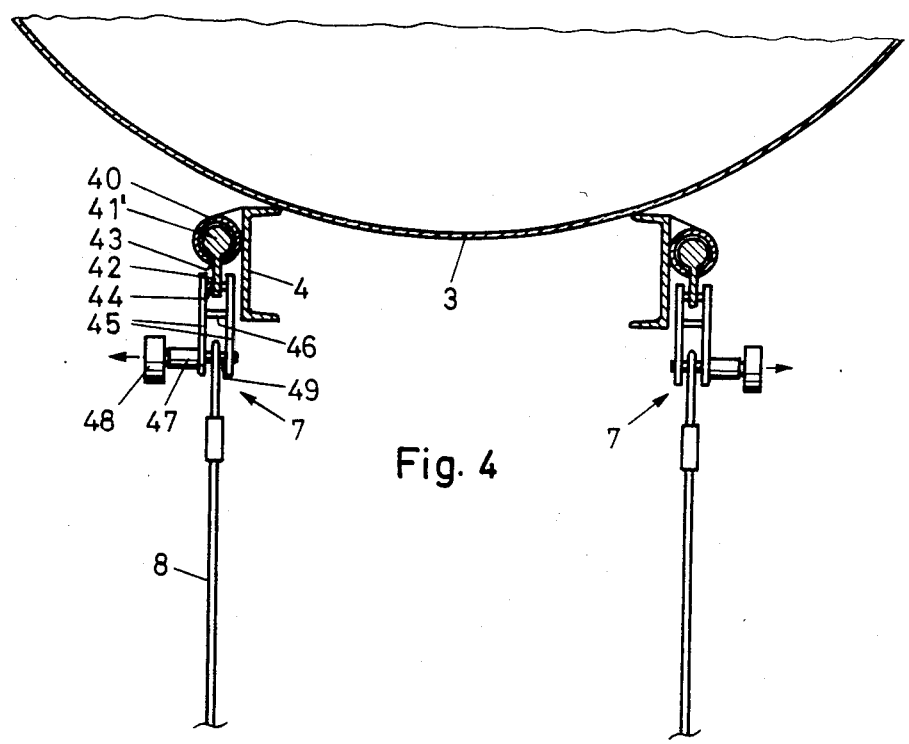
FIG. 4 is a cross-section through the embodiment according to FIG. 3.

The silo according to FIGS. 3 and 4 also has two support members 4 connected with the side wall 3 of the silo container 2. Here the guide 5 consists of a longitudinally split circular tube 40 which is welded to the side of the support member 4. An upper stop block 41 and a additional lower stop block 44 for the coupling element 7 are connected with the tube 4. The coupling element 7 here includes a bar 41' which is guided with play in the tube 40 and has an arm 42 projecting radially therefrom. The arm 42 projects through the slot 43 in the tube 40 and is hingedly connected with two plates 45 by means of a pin 44. The plates 45 are riveted together by means of an additional pin 46. A sleeve 47, in turn, is attached to one plate 45, and a bolt 49 which is also provided with a grip 48 is guided in this sleeve 47. The bolt 49 is prebiased by a spring (not shown) into the illustrated position where it projects into a bore in the opposite plate 45. The coupling element 7 according to FIGS. 3 and 4 is activated in the same manner as that according to FIGS. 1 and 2.

Figure 5:
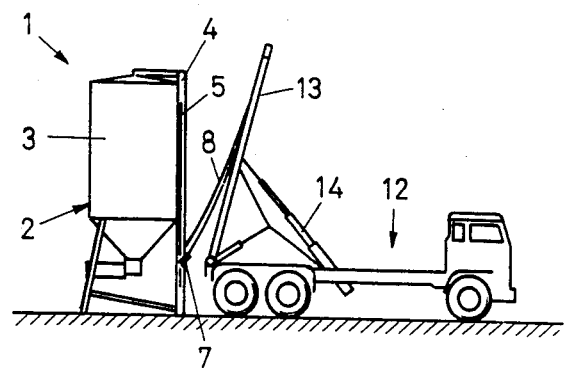
FIGS. 5 through 7 are the steps in loading the silo according to the invention.
Figure 6:
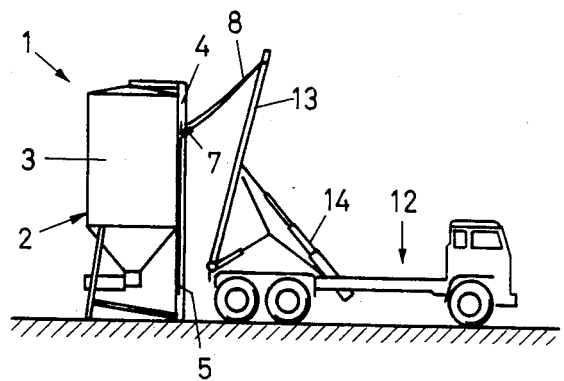
Figure 7:
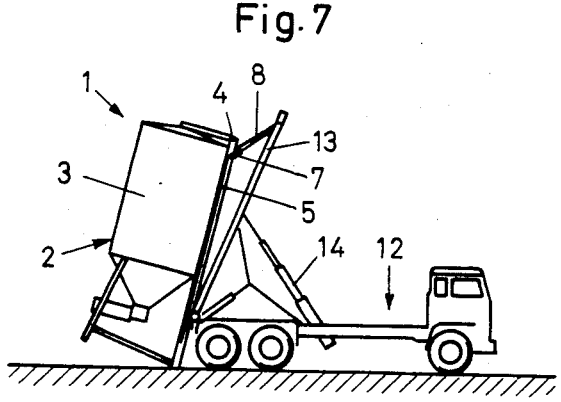

The loading of the silo 1 onto a transport vehicle is illustrated in FIGS. 5 through 7. First, the vehicle 12 backs up to the silo 1 and pivots its loading frame 13 into a nearly vertical position by means of two telescoping cylinders 14. The cables 8 are wound out to such an extent that their end loops can be coupled to the coupling elements 7, which are in the lower end position (FIGS. 2 and 4). The cables 8 are then partially reeled up (FIG. 6), whereby the coupling elements 7 slide up along their guides 5. The vehicle 12 then backs up somewhat until it almost contacts the silo 1. The cables 8 are reeled up further until the coupling elements 7 abut their upper stops 6. As the vehicle's loading frame 13 is lowered, the cables 8 also cause the silo 1 to tip (FIG. 7) and finally be loaded onto the loading frame 13, whereby it rests on its support members 4. The unloading takes place in the reverse order.

What is claimed is:

1. Silo having an attachment device for connecting the upper portion of the silo to a tippable loading frame of a transport vehicle, with improvements characterized by the attachement device comprising at least one vertically extending fixed guide extending along the silo container, a stop on the guide at the upper portion of the silo, and a coupling element slidable along the guide for connecting said silo via a cable to said tippable loading frame.

2. Silo according to claim 1 in which the attachment device includes two parallel guides each having a slidable coupling element.

3. Silo according to claim 1 or 2 in which the guide includes a bar arranged parallel to the side wall of the silo, both ends of which bar are attached to a support member connected with the silo container and which bar is surrounded by the coupling element with play.

4. Silo according to claim 3 in which the upper end of the bar is bent to form the stop.

5. Silo according to claim 1 or 2 in which the guide is a hollow, split tube connected with the silo and the coupling element is slidably guided in said tube.

6. Silo according to claim 5 in which the hollow split tube has a circular cross-section, and the coupling element includes a cylindrical rod guided with play in the tube, which rod also has an arm projecting radially through the split in the tube.

7. Silo according to claim 5 in which the hollow tube is attached to a support member connected with the silo.

* * * * *